(12) United States Patent
Debban et al.

(10) Patent No.: US 9,904,025 B2
(45) Date of Patent: Feb. 27, 2018

(54) COMPRESSION-RESISTANT SEISMIC FIBER OPTIC CABLE FOR REPEATED DEPLOYMENT

(71) Applicant: OFS Fitel, LLC, Norcross, GA (US)

(72) Inventors: Harold P Debban, Snellville, GA (US); Peter A Weimann, Atlanta, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 15/075,834

(22) Filed: Mar. 21, 2016

(65) Prior Publication Data

US 2016/0313175 A1  Oct. 27, 2016

Related U.S. Application Data

(60) Provisional application No. 62/151,519, filed on Apr. 23, 2015.

(51) Int. Cl.
| | |
|---|---|
| *G02B 6/44* | (2006.01) |
| *G02B 6/04* | (2006.01) |
| *G01H 9/00* | (2006.01) |
| *G01V 1/22* | (2006.01) |
| *G01V 1/38* | (2006.01) |

(52) U.S. Cl.
CPC ............ G02B 6/443 (2013.01); G01H 9/004 (2013.01); G01V 1/226 (2013.01); G02B 6/04 (2013.01); G02B 6/4433 (2013.01); G02B 6/4482 (2013.01); *G01V 1/3808* (2013.01)

(58) Field of Classification Search
CPC ...... G02B 6/04; G02B 6/4433; G02B 6/4482; G02B 6/443; G01H 9/004; G01V 1/40; G01V 1/189; G01V 1/226

USPC ............... 385/12–13, 100–115; 264/1.28
See application file for complete search history.

(56) References Cited

U.S. PATENT DOCUMENTS

| | | | |
|---|---|---|---|
| 6,392,151 B1* | 5/2002 | Rafie ............... | E21B 17/206 174/106 R |
| 2009/0022460 A1* | 1/2009 | Lu ................... | G02B 6/4475 385/114 |
| 2009/0214168 A1* | 8/2009 | Roscoe ............. | H01B 9/005 385/101 |

(Continued)

*Primary Examiner* — Akm Enayet Ullah
*Assistant Examiner* — Michael Mooney
(74) *Attorney, Agent, or Firm* — Smith Tempel Bloha, LLC

(57) ABSTRACT

Embodiments of the invention include a compression-resistant seismic optical fiber cable for repeated deployment. The seismic optical fiber cable includes a central core tube dimensioned to receive at least one bundle of optical fibers. The central core tube is dimensioned to allow the optical fibers in the at least one bundle of optical fibers to relax relative to the other optical fibers. The seismic optical fiber cable also includes at least one strength member layer surrounding the central core tube. The strength member layer provides flexibility and tensile strength to the seismic optical fiber cable. The seismic optical fiber cable also includes a jacket surrounding the strength member. The seismic optical fiber cable also includes at least one rigid fiber reinforced composite rod linearly applied within the jacket. The one linearly-applied rigid fiber reinforced composite rod provides compressive resistance for the seismic optical fiber cable.

7 Claims, 2 Drawing Sheets

(56) References Cited

U.S. PATENT DOCUMENTS

2011/0150398 A1\* 6/2011 Zimmel ............... G02B 6/4433
                                                        385/81
2013/0084047 A1\* 4/2013 Baucom ................... G02B 6/44
                                                        385/114

\* cited by examiner

COMPRESSION-RESISTANT SEISMIC FIBER OPTIC CABLE FOR REPEATED DEPLOYMENT

STATEMENT REGARDING RELATED APPLICATIONS

This patent application claims priority under 35 U.S.C. § 119(e) to U.S. Provisional Patent Application Ser. No. 62/151,519, filed on Apr. 23, 2015, entitled, "Compression-Resistant Seismic Fiber Optic Cable For Repeated Deployment," the entire contents which are hereby incorporated by reference.

BACKGROUND OF THE INVENTION

Field of Invention

The invention relates to optical fiber cables. More particularly, the invention relates to optical fiber cables used for seismic mapping of terrestrial or underseas geological formations.

Description of Related Art

Advanced techniques for seismic mapping of underground geological formations use multiple seismic sensor boxes deployed in a large x-y array spread over the area being surveyed. The sensor boxes are typically motion sensors, for example, accelerometers. In typical methods and systems, the sensor boxes record seismic activity by converting detected motion to an optical signal. Optical signals from the seismic sensor boxes are transmitted over optical fibers to a base station, where data from the sensor box array is collected and processed. Each seismic sensor box communicates with the base station over its dedicated optical fiber.

In a typical seismic sensor box array, a main optical fiber seismic sensing cable, many meters in length, is deployed over a portion of the land or undersea area being mapped. Many cables, typically arranged in a parallel array, may be used to cover the mapped area. For undersea mapping, the array of multiple cables may be towed over a seabed by an ocean going vessel.

A relatively unique characteristic of such terrestrial seismic sensing optical fiber cables is that they are deployed and redeployed many times during the service life of the cable. This redeployment contrasts with most fiber optic cable, which typically is installed in one place and remains stationary for the service life of the cable.

In terrestrial seismic sensing applications, it is desirable to deploy the same system of cables and sensors repeatedly to map large areas, while also minimizing capital cost. It is desirable to use fiber optic cables in such systems due to their sensitivity and low power consumption requirements relative to copper-based cabling systems. Rugged conventional telecommunications-grade cables are relatively difficult to use in this type of application. Rugged conventional telecommunications-grade cables are relatively stiff and difficult to work with, and their weight and size restricts the length of cable that can be placed on a reel. Small flexible cables work better for deployment in this type of application, but small flexible cables typically require special handling by hand to protect the fibers from breaking during the hundreds of deployments required from a typical sensor cable system, thus limiting the lifetime of the system.

SUMMARY OF THE INVENTION

The invention is embodied in a compression-resistant seismic optical fiber cable for repeated deployment. The seismic optical fiber cable includes a central core tube dimensioned to receive at least one bundle of optical fibers. The central core tube is dimensioned to allow the optical fibers in the at least one bundle of optical fibers to relax relative to the other optical fibers. The seismic optical fiber cable also includes at least one strength member layer surrounding the central core tube. The strength member layer provides flexibility and tensile strength to the seismic optical fiber cable. The seismic optical fiber cable also includes a jacket surrounding the strength member. The seismic optical fiber cable also includes at least one rigid fiber reinforced composite rod linearly applied within the jacket. The one linearly-applied rigid fiber reinforced composite rod provides compressive resistance for the seismic optical fiber cable.

DETAILED DESCRIPTION OF EXEMPLARY EMBODIMENTS

Figure 1:
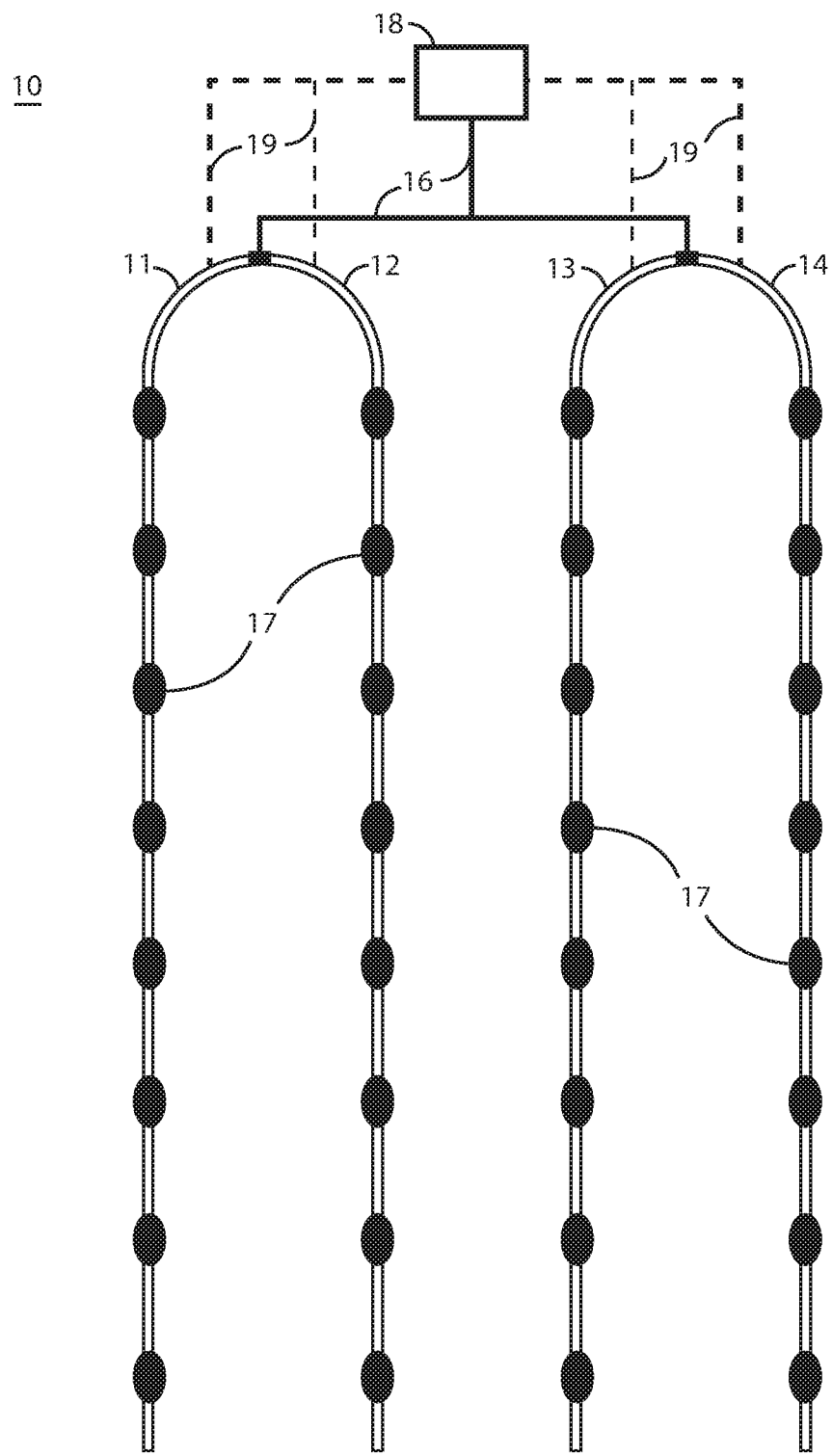
FIG. 1 is a simplified, schematic view of compression-resistant seismic fiber optical cables used in a terrestrial seismic sensing application.

In the following description like reference numerals indicate like components to enhance the understanding of the invention through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

According to embodiments of the invention, a new compression-resistant cable has been developed that is small enough and flexible enough to meet desired size/weight/handling constraints, while also being sufficiently compression resistant to survive hundreds of cycles of repeated deployment. This inventive cable uses a hybrid reinforcement system including flexible yarns to provide tensile strength and linearly-applied rigid fiber reinforced composite rods to provide compressive resistance. The inventive cable contains loose fibers inside a core tube to allow the optical fibers to relax relative to one another during repeated deployment.

The inventive cable described herein is a compact cable that can be specifically designed for repeated deployment seismic use. Conventional cable design approaches typically do not work well for seismic cables. For example, tubes in loose tube type cables can flatten and crack, typically damaging or breaking optical fibers. Conventional ribbon cables or other types of conventional cable do not allow the optical fibers to fully relax when the cable is bent or twisted. The inventive cable structure described herein is optimized for use so that the cable can sustain more than 300 cycles of cable deployments using an automated deployment and retrieval system without breaking the optical fibers, while also allowing the optical fibers the freedom to relax.

FIG. 1 is a simplified, schematic view 10 of compression-resistant seismic fiber optical cables used in a terrestrial seismic sensing application, according to embodiments of the invention. FIG. 1 shows an array of compression-resistant seismic fiber optical cables 11, 12, 13, and 14, each carrying a plurality of seismic sensor boxes 17. The drawing is not to scale. Sensor boxes for sensing seismic data typically are accelerometers or some other form of motion sensor. The spacing of the sensor boxes along the optical fiber cables typically is 2 to 30 meters, more commonly 5 to 15 meters. The compression-resistant seismic fiber optical cables 11, 12, 13, and 14 may be attached to a towing harness 16, and the towing harness 16 may be attached to a towing vehicle 18. The optical data from the multiple seismic sensors boxes 17 is transmitted to a data storage device typically located on the towing vehicle 18 via one or more optical connections 19 between the compression-resistant seismic fiber optical cables 11, 12, 13, and 14 and the towing vehicle 18.

The data storage device typically is a computer that detects the optical signals and stores data representing the optical data. The data is processed by a data processor to produce the desired seismic map. The data storage device may include optical receivers or optical transceivers.

Figure 2:
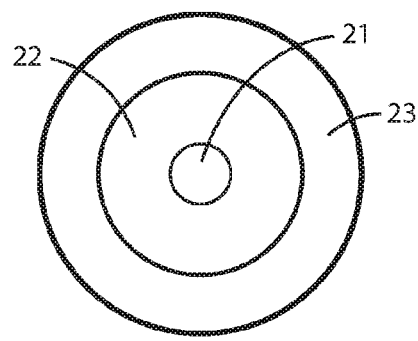
FIG. 2 is a simplified, schematic cross-sectional view of an optical fiber used in a compression-resistant seismic fiber optic cable, according to embodiments of the invention.

FIG. 2 is a simplified, schematic cross-sectional view of an optical fibers used in a compression-resistant seismic fiber optic cable, according to embodiments of the invention. The optical fiber includes a core 21 of the glass optical fiber, and a cladding 22 surrounding the core 21. The optical fiber also includes an optical fiber coating 23 surrounding the cladding 22. The core 21 is a single mode optical fiber core, with a diameter typically in the range of 4-10 microns. The core 21 preferably is germanium-doped silica, and preferably has a relatively high delta to reduce bending loss. The cladding 22 typically has a diameter of between 75 to 85 microns. The coating 23 may be a single coating, or a dual coating, and typically has an overall diameter of 170 microns or less, preferably 155-170 microns. It should be understood that other suitable optical fibers can be used in the compression-resistant seismic fiber optic cable, according to embodiments of the invention, including optical fibres meeting the ITU-T G.657.A1 standard.

Conventionally, a plurality of seismic cable optical fibers are collectively housed inside of an optical fiber buffer encasement. The optical fiber buffer encasement typically includes a plurality of optical fibers encased and embedded in a relatively soft acrylate matrix, which is surrounded by a relatively rigid encasement tube or layer. However, adhering the optical fibers to each other in an acrylate matrix and surrounding the acrylate matrix by a rigid encasement tube may not allow the optical fibers to relax, which could create unacceptable noise in the optical fibers.

Other conventional seismic cable configurations include optical fiber cables having one or more loose tubes therein. However, such loose tube-type cables often are too big and/or not rugged enough for seismic applications. Still other conventional configurations include optical fiber cables having a central core. However, such central core cables often are not rugged enough for seismic applications.

Figure 4:
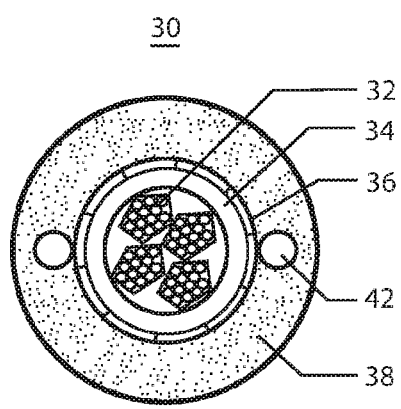
FIG. 4 is a cross-sectional view of the compression-resistant seismic fiber optic cable shown in FIG. 3, according to embodiments of the invention.
Figure 3:
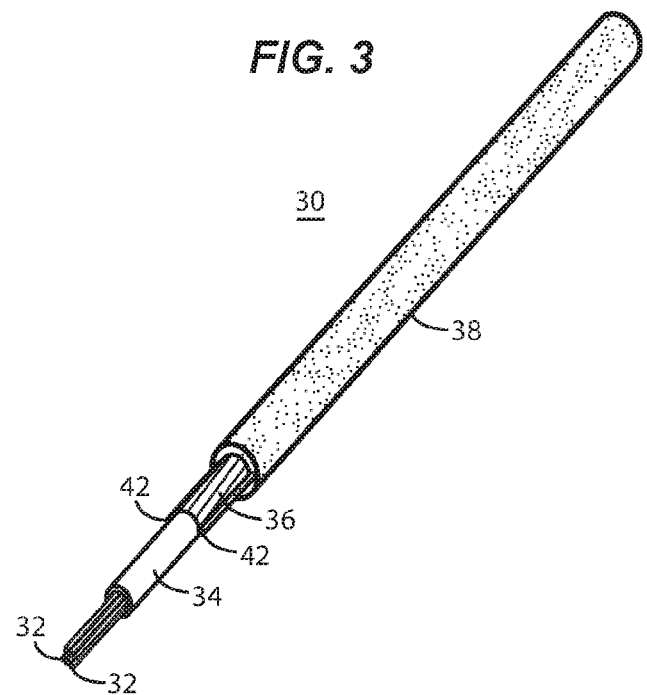
FIG. 3 is a perspective view of a compression-resistant seismic fiber optic cable, according to embodiments of the invention.

FIG. 3 is a perspective view of a compression-resistant seismic fiber optic cable 30, according to embodiments of the invention. Also, FIG. 4 is a cross-sectional view of the compression-resistant seismic fiber optic cable 30 shown in FIG. 3, according to embodiments of the invention.

The cable 30 includes one or more optical fiber bundles 32 freely positioned in a loose configuration within a core tube 34. The core tube can be made from impact-modified polypropylene, or other suitable material, such as high density polyethylene (HDPE), poly(butylene terephthalate), nylon or polyvinylidene fluoride (PVDF).

Each optical fiber bundle 32 can include any suitable number of optical fibers, e.g., thirteen optical fibers per optical fiber bundle 32. Also, the cable 30 can include any suitable number of optical fiber bundles 32, e.g., four optical fiber bundles 32, for a total of 52 optical fibers in the cable 30. For such a configuration, the core tube 34 can have an inner diameter of approximately 3 millimeters (mm)±0.3 mm, and an outer diameter of approximately 4.0 mm±0.3 mm.

Each optical fiber in the cable 30 can be uniquely identified using a combination of fiber color and/or ring marking, e.g., in contrasting colors. Also, each optical fiber bundle 32 can be bundled together using colored binder threads, e.g., colored polyester sewing thread, helically wrapped around the group of optical fibers. For example, the colored sewing thread can be applied with at least one twist around the optical fiber bundle 32 every 30 millimeters (mm) of fiber bundle.

In some conventional seismic fiber optic cable configurations, a plurality of optical fibers is encased in a relatively soft matrix surrounded by a relatively rigid encasement layer to form an optical fiber buffer encasement. However, according to embodiments of the invention, in the seismic optical fiber cable 30, the optical fiber bundles 32 are loosely encased within the central core tube 34. In this manner, the loose configuration of the optical fiber bundles 32 within the central core tube 34 provides relatively low surface friction between the optical fibers and the core tube 34, which allows each of the optical fibers within each optical fiber bundle 32 the freedom to relax relative to the other optical fibers in the optical fiber bundle 32.

The cable 30 also includes one or more strength member layers 36 wrapped or otherwise formed around the central core tube 34. The strength member layer 36 can be one or more wraps of reinforcing yarns surrounding the central core tube 34, such as aramid yarn wraps, fiberglass yarn wraps or other flexible reinforcement. The strength member layer 36 provides flexibility and tensile strength to the seismic optical fiber cable 30. The core tube 34 isolates the optical fiber bundles 32 from the strength member layer(s) 36.

The cable 30 also includes a sheath or jacket 38 formed around or otherwise surrounding the strength member layer(s) 36. The jacket 38 can be a thermoplastic polyurethane (TPU) elastomer jacket. Alternatively, the jacket 38 can be a urethane jacket, or a jacket made of some other suitable material, such as poly(vinylidene fluoride) or other types of thermoplastic elastomers. The jacket 38 can have an outer diameter of approximately 7.30 mm±0.3 mm.

The jacket 38 includes one or more linearly-applied rigid fiber reinforced composite rods 42 formed therein. The rods 42 can be made of fiberglass-epoxy, or other suitable material. The rods 42 can have a diameter of approximately 0.90 mm. The linearly-applied rigid fiber reinforced composite rods 42 are positioned within the jacket 38 to provide compressive (crush) resistance and kink resistance to the seismic optical fiber cable 30, as well as overall toughness for the seismic optical fiber cable 30.

In addition to the features of the cable 30 described above, the overall design of the cable 30 provides vibration isolation for the optical fiber bundles 32. Also, the tensile strength of the cable 30, as provided by the strength member layer(s)

36, should be sufficient to keep movement of the optical fibers to a minimum during deployment of the cable 30. Also, the cable strain should be less than the excess fiber length in the cable 30.

It will be apparent to those skilled in the art that many changes and substitutions can be made to the embodiments of the invention herein described without departing from the spirit and scope of the invention as defined by the appended claims and their full scope of equivalents.

The invention claimed is:

1. A seismic optical fiber cable, comprising:
   a central core tube dimensioned to receive at least one bundle of optical fibers, wherein the central core tube is dimensioned to allow the optical fibers in the at least one bundle of optical fibers to relax relative to the other optical fibers, and wherein the optical fibers in the at least one bundle of optical fibers are held together using a binder thread that allows movement among the individual optical fibers within the bundle;
   at least one strength member layer surrounding the central core tube, wherein the strength member layer provides flexibility and tensile strength to the seismic optical fiber cable;
   a jacket surrounding the strength member; and
   at least one rigid fiber reinforced composite rod linearly applied within the jacket, wherein the at least one linearly-applied rigid fiber reinforced composite rod provides compressive resistance for the seismic optical fiber cable.

2. The seismic optical fiber cable as recited in claim 1, wherein the at least one binder thread is applied to the optical fiber bundle with at least one complete twist around the optical fiber bundle for every 30 millimeters (mm) of length of the optical fiber bundle.

3. The seismic optical fiber cable as recited in claim 1, wherein the at least one rigid fiber reinforced composite rod is made of fiberglass-epoxy.

4. The seismic optical fiber cable as recited in claim 1, wherein the jacket is a thermoplastic polyurethane (TPU) jacket.

5. The seismic optical fiber cable as recited in claim 1, wherein the jacket is a urethane jacket.

6. The seismic optical fiber cable as recited in claim 1, wherein the central core tube is dimensioned to receive four optical fiber bundles, and wherein each optical fiber bundles has 13 optical fibers.

7. The seismic optical fiber cable as recited in claim 1, wherein the combination of the at least one strength member layer and the linearly-applied rigid fiber reinforced composite rods within the jacket comprises a hybrid reinforcement system.

* * * * *